(12) United States Patent
Papadimitriou et al.

(10) Patent No.: US 7,505,876 B2
(45) Date of Patent: Mar. 17, 2009

(54) SYSTEMS AND METHODS FOR SIMULTANEOUS SUMMARIZATION OF DATA CUBE STREAMS

(75) Inventors: Spyridon Papadimitriou, White Plain, NY (US); Jimeng Sun, Pittsburgh, PA (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/620,679

(22) Filed: Jan. 7, 2007

(65) Prior Publication Data

US 2008/0168375 A1 Jul. 10, 2008

(51) Int. Cl.
  G06F 15/00 (2006.01)
  G06F 17/30 (2006.01)
(52) U.S. Cl. .......................... 702/189; 707/6
(58) Field of Classification Search ................. 702/183, 702/189, 187; 707/6, 7, 102; 714/47; 340/286.05
  See application file for complete search history.

(56) References Cited

U.S. PATENT DOCUMENTS

2007/0294247 A1 * 12/2007 Papadimitriou et al. ........ 707/6

OTHER PUBLICATIONS

Ming-Jyh Hsieh et al, Integrating DCT and DWT for Approximating Cube Streams, CIKM'05, Oct. 31-Nov. 5, 2005, 179-186, Bremen, Germany.

Jiawei Han et al, Stream Cube: An Architecture for Multi-Dimensional Analysis of Data Streams, Distributed and Parallel Databases 18, 2005, 173-197, Springer Science + Business Media, Inc., Manufactured in The Netherlands.

Lieven De Lathauwer, Signal Processing based on Multilinear Algebra, Sep. 1997, Leuven, Belgium.

Jimeng Sun et al, Window-based Tensor Analysis on High-dimensional and Multi-aspect Streams, Proceedings of the International Conference on Data Mining, Hong Kong, China, Dec. 2006.

Jimeng Sun et al.; "Beyond Streams and Graphs: Dynamic Tensor Analysis;" KDD'06, Aug. 20-23, 2006, Philadelphia, PA, 2006.

* cited by examiner

*Primary Examiner*—John H Le
(74) *Attorney, Agent, or Firm*—Cantor Colburn LLP; Mark Wardas

(57) ABSTRACT

In an exemplary embodiment, some of the main aspects of the present invention are the following: (i) Data model: We introduce tensor streams to deal with large collections of multi-aspect streams; and (ii) Algorithmic framework: We propose window-based tensor analysis (WTA) to effectively extract core patterns from tensor streams. The tensor representation is related to data cube in On-Line Analytical Processing (OLAP). However, our present invention focuses on constructing simple summaries for each window, rather than merely organizing the data to produce simple aggregates along each aspect or combination of aspects.

6 Claims, 8 Drawing Sheets

*1st Factor*
*(a1) Daily Pattern*

*1st Factor*
*(b1) Main Pattern*

*1st Factor*
*(c1) Correlated Pattern*

*(a2) Abnormal Residual*

*(b2) Three Abnormal Sensors*

*(c2) Voltage Anomally*

1000

SYSTEMS AND METHODS FOR SIMULTANEOUS SUMMARIZATION OF DATA CUBE STREAMS

STATEMENT REGARDING FEDERALLY SPONSORED RESEARCH

This invention was made with Government support under Contract No.: H98230-05-3-0001 awarded by U.S. Department of Defense. The Government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to analysis of data streams in general, and in particular to a method for summarization of streams of time-ordered information.

2. Description of Background

Before our invention, in the standard stream model, each value is associated with a (timestamp, stream-id) pair. However, the stream-id itself may have some additional structure. For example, it may be decomposed into (location-id, type) =stream-id. Each such component of the stream-id an 'aspect'. This additional structure should not be ignored in data exploration tasks, since it may provide additional insights. Thus the typical "flat-world view" is insufficient. In summary, even though the traditional data stream model is quite general, it cannot easily capture some important aspects of the data.

As an example, consider the monitoring of natural habitats. Sensitive wildlife and habitats need constant monitoring in a non-intrusive and non-disruptive manner. In such cases, wireless sensors are carefully deployed throughout those habitats to monitor the microclimates such as temperature, humidity and light intensity in and around those areas, as well as the voltage level of the sensors, in real time. In this regard, measurements from a particular sensor and from a given location (say temperature around a nesting burrow) as a single stream. In general, there are large numbers of such streams that come from different sensor types and locations. Thus, sensing location (which is hard-coded through the hardware sensor id) and sensor type give us two different 'aspects' of those streams, which should be clearly differentiated. In particular, it is not sensible to blindly analyze all streams together (for example, it is unusual to compare the humidity at location 'A' to the sensor voltage at location 'B'). Instead, the streams of same type but different locations are often analyzed together for spatial variation patterns. Similarly, the streams at the same location but of different type can be studied for cross-type correlations. In general, a more challenging problem is how to analyze both location and type simultaneously and over time.

Other applications include computer cluster monitoring (example 'aspects': host-id and metric type), intelligent building monitoring (example 'aspects': location and sensor type) and management, monitoring of network traffic volumes (example 'aspects': source node and destination node) for any type of network (e.g., road networks, computer networks) or graphs (e.g., social networks with nodes corresponding to individuals and measurements of "level of interaction" at different time instants). Finally, any number of aspects, in addition to the timestamp aspect, is possible. For example, network traffic volume measurements may have an additional 'aspect' of traffic type (besides the source node and destination node aspects), which may include the dimensions of, e.g., voice, video, and data (for computer networks).

Improved methods of mining additional structure from streams of data in part gives rise to the present invention.

SUMMARY OF THE INVENTION

The shortcomings of the prior art are overcome and additional advantages are provided through the provision of a method for summarization of streams of time-ordered information, the method comprising: observing a plurality of sensors, each of the plurality of sensors represent a value at a plurality of aspects; determining a timestamp aspect which forms a window size by sampling the sensors at a predetermined time interval, the window size determines the time interval for a stream summary; forming a stream array, the stream array includes the value, the plurality of aspects, and the timestamp aspect; and constructing the stream summary by using the window size and a step size, the step size determines the overlap between consecutive the window, wherein time is divided into consecutive windows and the stream summary for each of the windows is incrementally maintained.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which is a method for summarization of streams of time-ordered information.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
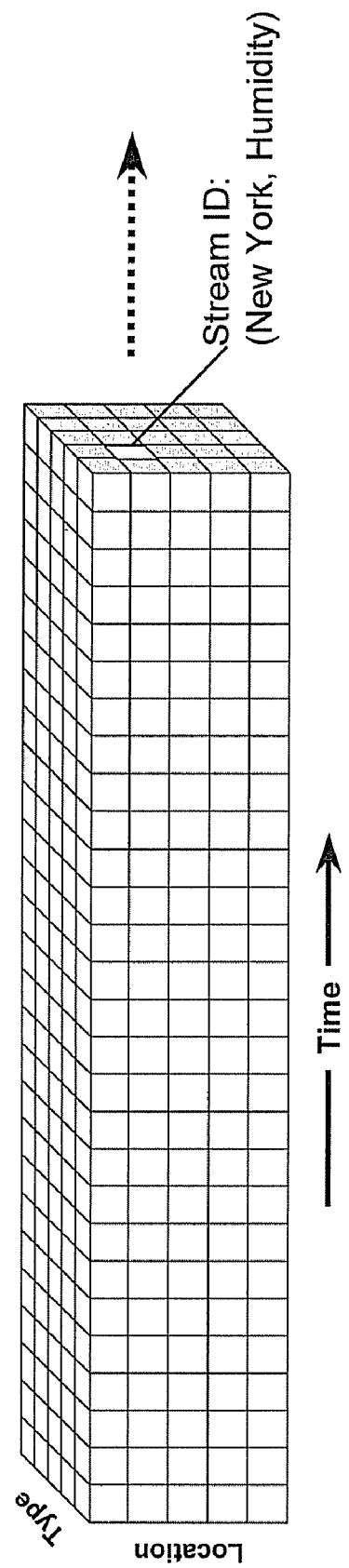
FIG. 1 illustrates one example of a graphical representation of a standard stream model, with two aspects of location and type, in addition to the timestamp aspect.

The detailed description explains the preferred embodiments of the invention, together with advantages and features, by way of example with reference to the drawings.

DETAILED DESCRIPTION OF THE INVENTION

Turning now to the drawings in greater detail, in an exemplary embodiment, some of the main aspects of the present invention are the following: (i) data model: we introduce tensor streams to deal with large collections of multi-aspect streams; and (ii) algorithmic framework: we propose window-based tensor analysis (WTA) to effectively extract core patterns from tensor streams.

The tensor representation is related to data cube in On-Line Analytical Processing (OLAP). However, our present invention focuses on constructing simple summaries for each window, rather than merely organizing the data to produce simple aggregates along each aspect or combination of aspects.

In this invention, we tackle the problem at two levels. First, we address the issue of modeling such high-dimensional and multi-aspect streams. More specifically, we present the tensor stream model, which generalizes multiple streams into high-order tensors represented using a sequence of multiarrays. Second, we study how to summarize the tensor stream efficiently. We generalize the moving/sliding window model from a single stream to a tensor stream. Every tensor window includes multiple tensors. Each of these tensors corresponds to the multi-aspect set of measurements associated with one timestamp. Subsequently, using multilinear analysis, which is a generalization of matrix analysis, we propose window-based tensor analysis (WTA) for tensor streams, which summarizes the tensor windows efficiently.

Intuition Behind the Formal Technique

In an exemplary embodiment, assume that we have a collection of sensor streams, each from a particular sensor type (e.g., temperature, humidity, light intensity) and from a particular location. Sensor type and sensor location are two aspects of each measurement, in addition to the timestamp aspect. All sensors (over all locations and over all types) may follow a similar trend. Additionally, the sensors nearer to windows show higher brightness and higher temperatures. Thus, in order to specialize the global general trend (over all locations and over all types) into a set of per-location trends (but over all types at each location) you multiply by 1 if it is a non-window sensor and by 1.2 if it is a window sensor (i.e., "window locations are typically 20% brighter and warmer"). Next, to further specialize the per-location trend into a reconstruction of the individual values (for a specific location and a specific measurement type), one might further scale it by, e.g., 2 if it is temperature, by 5 if it is light, and by −0.5 if it is humidity (i.e., "brightness is correlated with temperature, whereas humidity is anti-correlated with temperature, with the exact scaling factors depending on the relationship between measurement units").

Thus, in an exemplary embodiment, one can leverage the structure provided by the aspects in order to build a progressive approximation (for at least some "groups" of streams) and, obtain a dramatically more concise summary with little loss of accuracy. Starting from the actual measurements one would progressively construct the summaries leading up to the global trend (over all types and locations) by first observing that all measurements are similar on each individual location. Thus, an aggregate summary for each location (over all types) can be constructed. However, these aggregate summaries for different sensors would again be correlated. Thus, further compression into a global trend is possible.

Referring to FIG. 1 there is illustrated one example of a graphical representation of a standard stream model. In the standard stream model, each value is associated with a (timestamp, stream-id) pair. However, the stream-id itself may have some additional structure. For example, it may be decomposed into (location, measurement-type)=stream-id. We call each such component of the stream-id an aspect. Each aspect consists of a number of dimensions. Referring to FIG. 1, New York is one of the dimensions of the location aspect and humidity is another one of the dimensions of the type aspect.

In an exemplary embodiment of the present invention, we present techniques for extracting patterns from such streams, taking into account the additional structure that is available. In this regard, prior art approaches for analysis of data streams typically employ a "flat world" view, treating the collection of values from all streams as a tuple. However, there may be additional structure present. In contrast an embodiment of the present invention when utilized in, for example and not limitation, monitoring applications, each stream may be associated with a location and a type (or, in system monitoring, a host and a metric). Thus, the collection of values may be organized as an array, with rows corresponding to location and columns to type. Thus, sensing location and sensor type gives us two different aspects of the streams, which should be clearly differentiated. In particular, it is not sensible to blindly analyze all streams together (for example, it is unusual to compare the humidity of location A to the light intensity of location B). Instead, the streams of same type but different locations are often analyzed together for spatial variation patterns. Similarly, the streams at the same location but of different type can be studied for cross-type correlations. In addition to exploiting additional structure, the present invention, in contrast to prior art, uses this structure to choose the per-aspect summaries jointly, as will be explained in more detail below.

Figure 2:
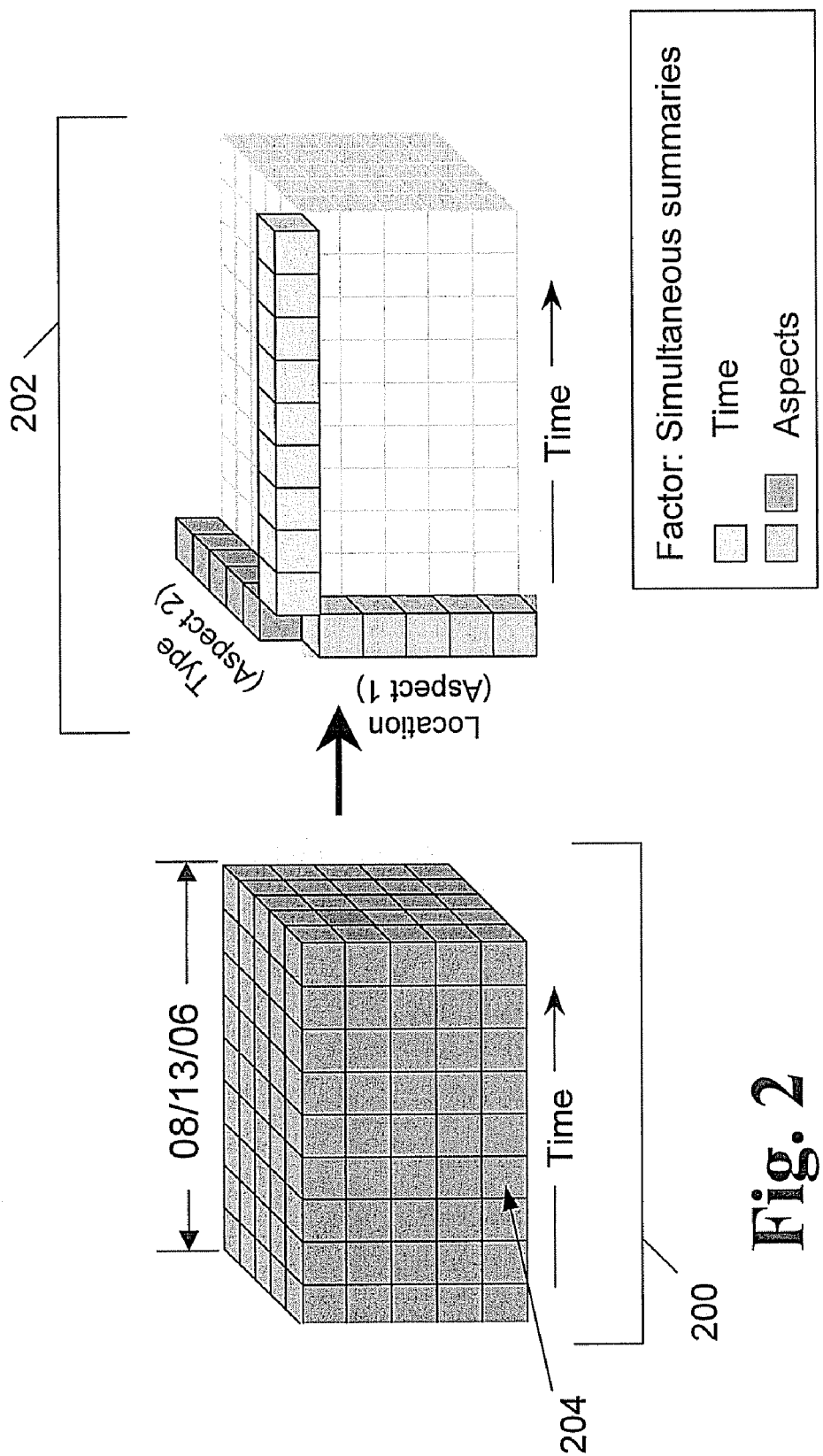
FIG. 2 illustrates one example of simultaneous summaries of time-ordered measurements with two aspects (location and type)
Figure 3:
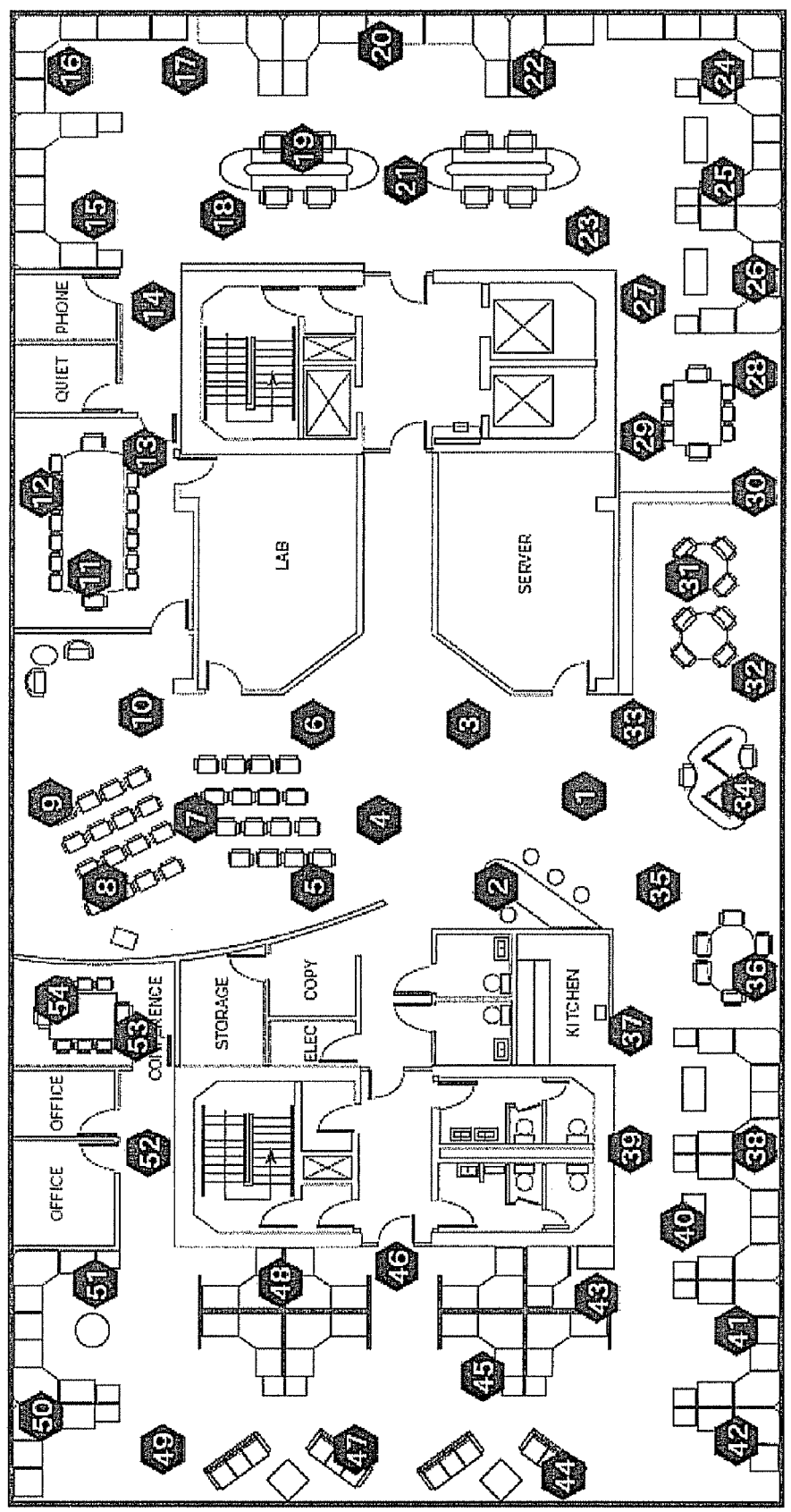
FIG. 3 illustrates one example of sensor placement throughout a location.

Referring to FIG. 2 there is illustrated one example of simultaneous summaries of two aspects (location and type) measured over time. Referring to FIG. 3 there is illustrated one example of sensor placement throughout a location. In an exemplary embodiment, in general, a more challenging problem is how to analyze both location and type simultaneously and over time. In this regard, sensors can be distributed throughout a location such as the location illustrated in FIG. 3. Data can then be collected as illustrated in FIG. 2 where one aspect variable is the location of the sensor and the other aspect variable is a type, where type can be temperature, humidity, light, voltage, etc.

The data is collected by a method that involves incrementally maintaining a summary of time intervals. The data from all streams during that interval constitutes a window shown as window 200 in FIG. 2.

The summary consists of one component per aspect variable, plus an additional component for time is illustrated as 202. The summary components are jointly chosen, so that combining the corresponding elements of each component can approximate the each data values. For example, the value at (4, 5, 1) illustrated as 204 in FIG. 2, corresponds to the fourth timestamp, fifth location and first type. It can be approximated by combining the fourth element of the time summary, with the fifth element of the location aspect summary and with the first element of the type aspect summary. The same is ensured for every other value. Each component of the summary may be examined alone, as well as in combination with other components. The latter is not possible if the summaries are not chosen jointly.

More generally, the summary may consist of more than one triples of components (also called factors). Each successive factor gives a refined approximation of the stream values and typically corresponds to a trend (either normal or abnormal). Finally, more than two aspects may be present.

Figure 4A:
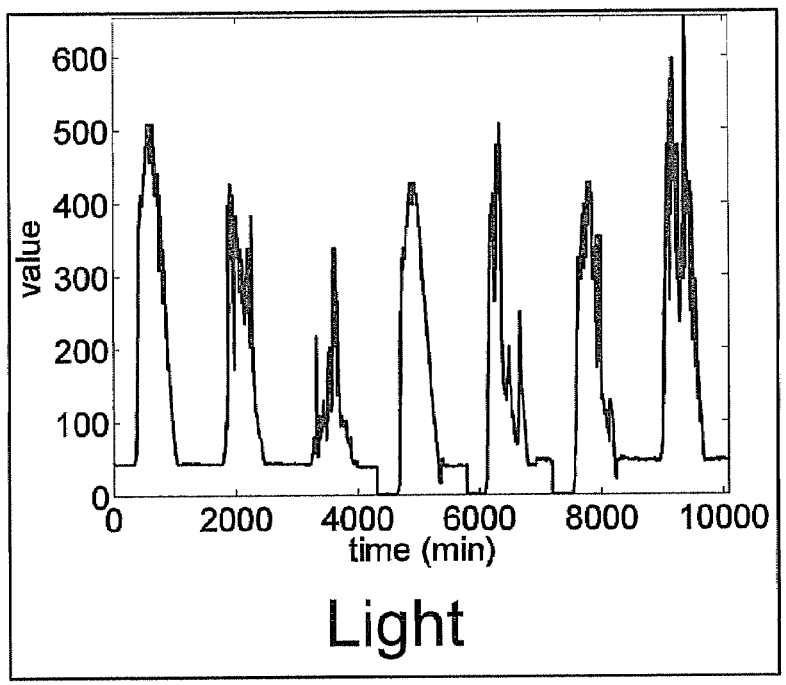
FIG. 4A-4D illustrates one example of measurements from a plurality of different types and kinds of environmental sensors.
Figure 4B:
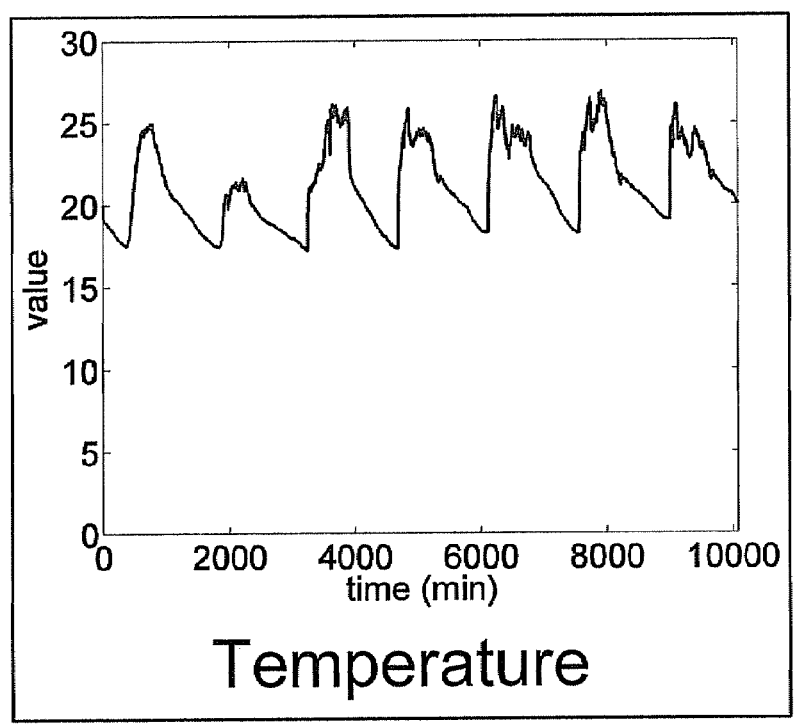
Figure 4C:
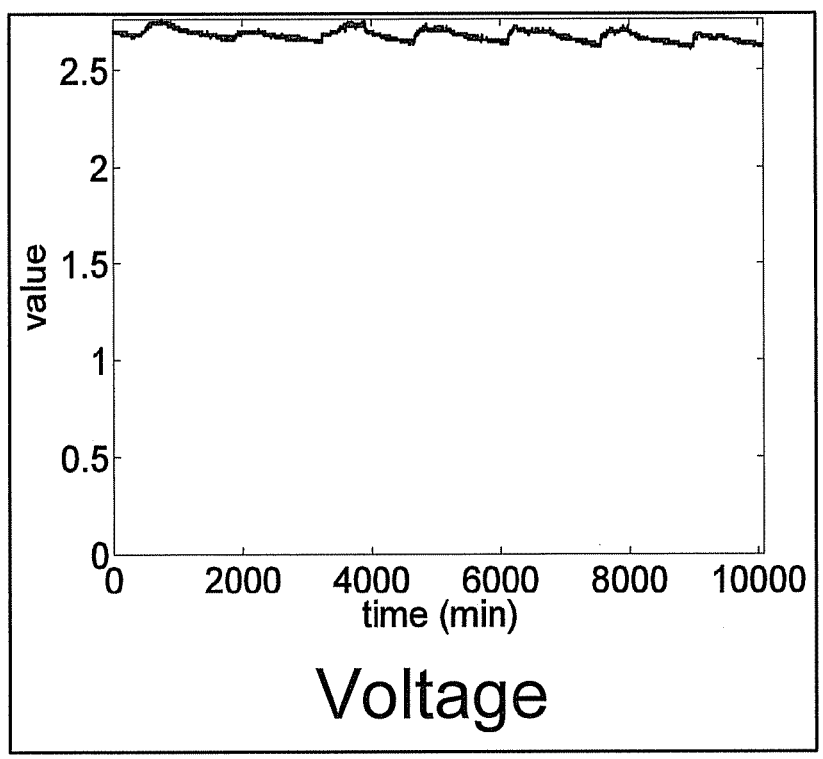
Figure 4D:
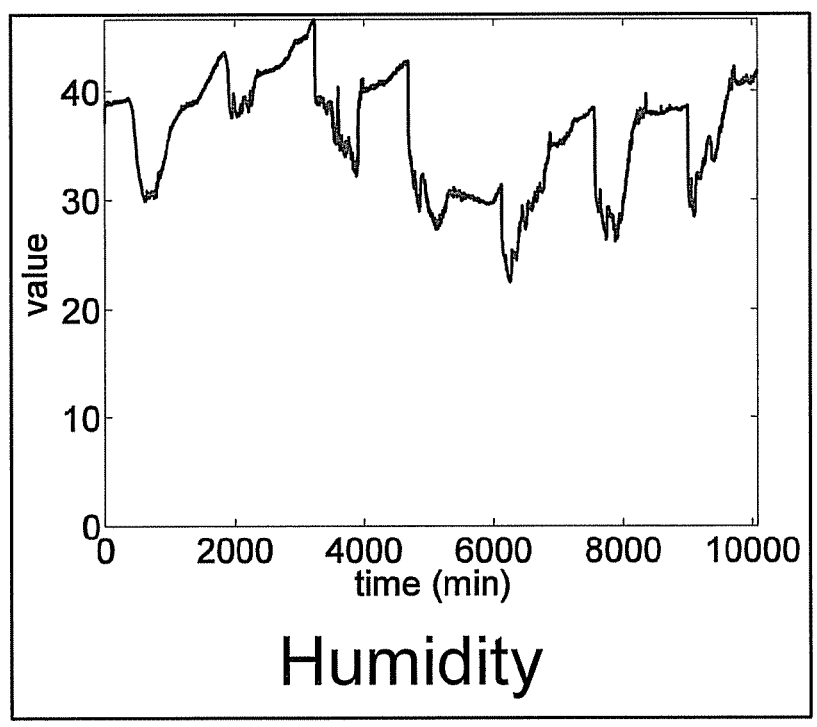

In an exemplary embodiment, referring to FIGS. 4A-4D illustrate one example of measurements from a plurality of different types and kinds of environmental sensors. In this regard, for example and not limitation, FIG. 4A illustrates measurements from a light sensor, FIG. 4B illustrate measurements from a temperature sensor, FIG. 4C illustrates measurements from a voltage sensor, and FIG. 4D illustrates measurements from a humidity sensor. In a plurality of exemplary embodiments a plurality of other types and kinds of sensors can be utilized to collect data.

Figure 5A:
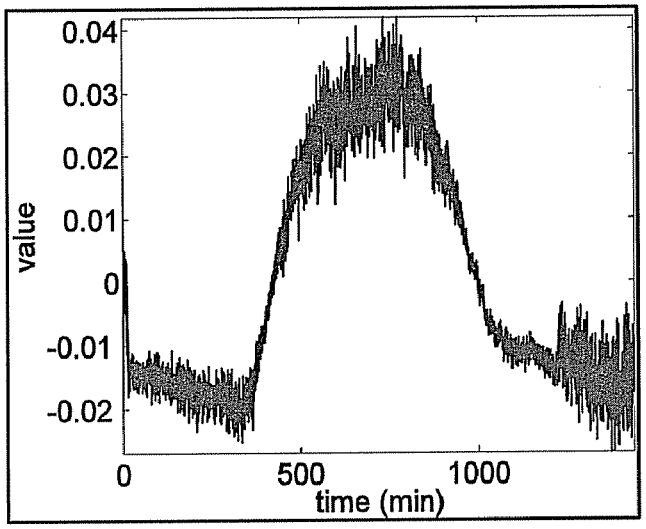
FIG. 5A-5F illustrates one example of the components of the first two factors.
Figure 5B:
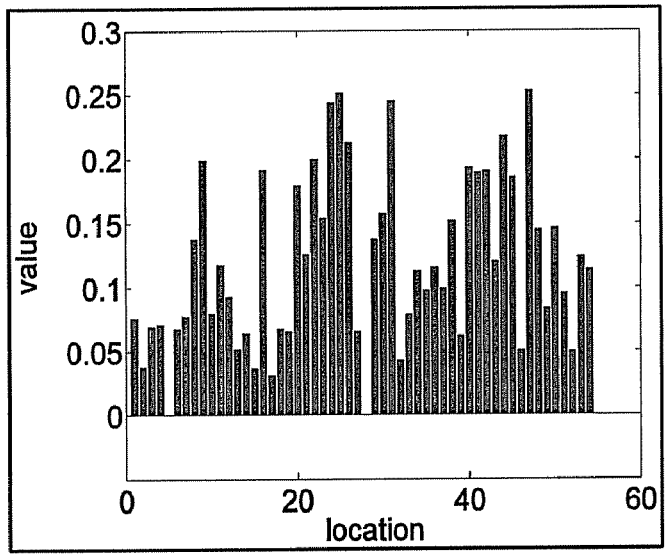
Figure 5C:
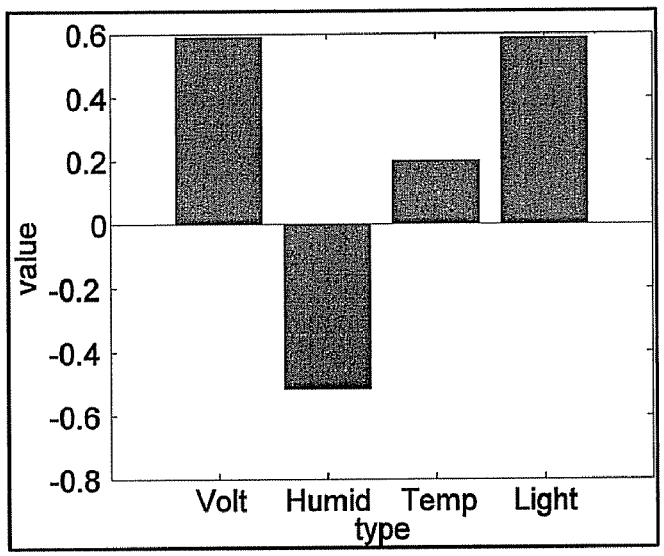

Referring to FIGS. 5A-5F there is illustrated one example of the components of the first two factors. In this regard FIGS. 5A-5C illustrate the first factor where FIG. 5A illustrates (a1) the daily pattern which is the time component, FIG. 5B illustrates (b1) the main factor which is the location component, and FIG. 5C illustrates (c1) the correlated pattern which is the type component.

FIGS. 5A-5C (a1, b1, c1) illustrate the three components (one for each aspect) of the first factor, which is the main trend. If we read the components independently, FIG. 5A (a1) shows the daily periodic pattern over time (high activation during the day, low activation at night); FIG. 5B (b1) shows the participation weights of all sensor locations, where the weights seem to be uniformly spread out; FIG. 5C (c1) shows that light, temperature and voltage are positively correlated (all positive values) while they are anti-correlated with humidity (negative value). All of those patterns can be confirmed from the raw data (partly shown in the previous figure). All three components act together scaled by the constant factor 238 to form an approximation of the data.

Figure 5D:
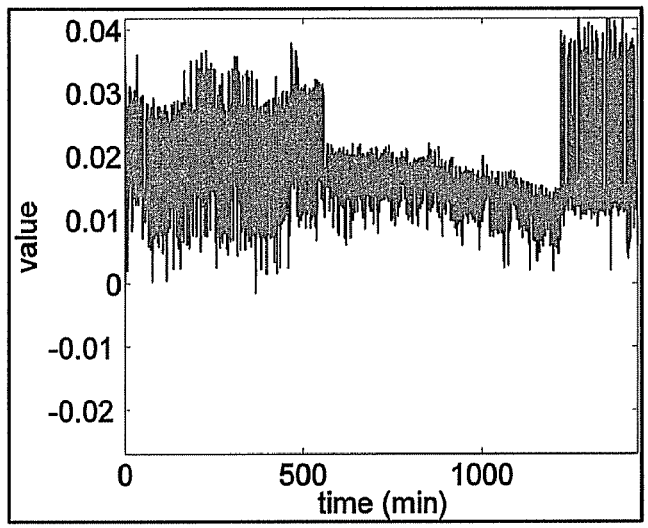
Figure 5E:
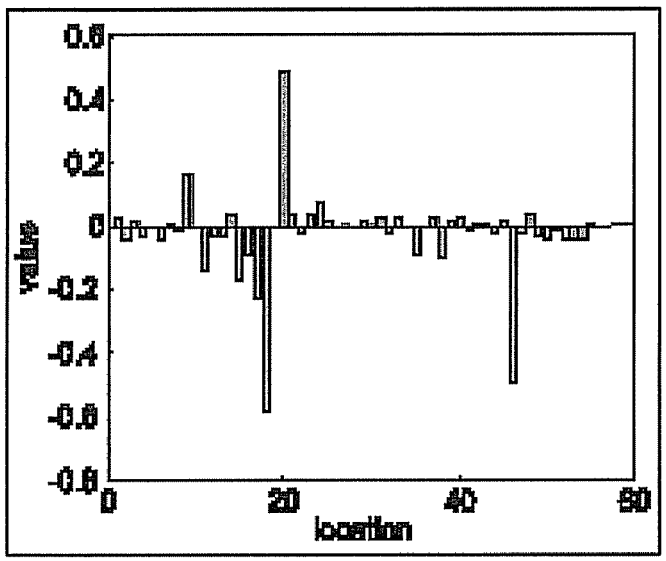
Figure 5F:
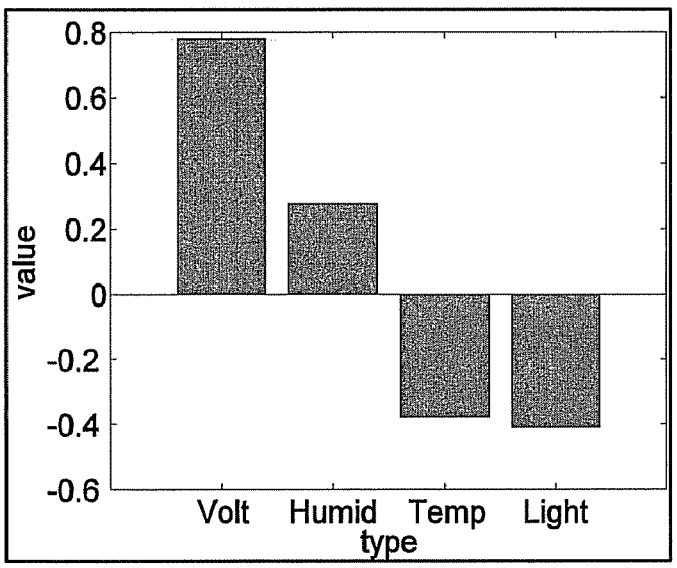

FIGS. 5D-5F illustrate the second factor where FIG. 5D illustrates (a2) the abnormal residual which is the time component, FIG. 5E illustrates (b2) three abnormal sensors which is the location component, and FIG. 5F illustrates (c2) voltage anomalies which is the type component.

In this regard, part of the residual of that approximation is shown as the second factor in FIGS. 5D-5F (a2, b2, c2), which corresponds to some major anomalies. More specifically, FIG. 5D (a2) suggests that this pattern is uniform across all time, without a clear trend as in (a1); FIG. 5E (b2) illustrates that two sensors have strong positive weights while one other sensor has a dominating low weight; FIG. 5F (c2) indicates that this happened mainly at voltage which has the most prominent weight. The residual (i.e., the information remaining after the first factor is subtracted) is in turn approximated by combining all three components and scaling by constant −154. In layman terms, two sensors have abnormally low voltage compared to the rest; while one other sensor has unusually high voltage. Again all three cases are confirmed from the data.

We present the tensor stream model, which generalizes multiple streams into high-order tensors represented using a sequence of multi-arrays. We generalize the moving/sliding window model from a single stream to a tensor stream. Subsequently, using multilinear analysis [4], which is a generalization of matrix analysis, we propose window-based tensor analysis (WTA) for tensor streams, which summarizes the tensor windows efficiently, using small core tensors associated with different projection matrices. Core tensors and projection matrices are analogous to the singular values and singular vectors of a matrix. Two variations of the algorithms for WTA are presented: 1) independent-window tensor analysis (IW), which treats each tensor window independently; 2) moving-window tensor analysis (MW), which exploits the time dependence across neighboring windows to reduce computational cost significantly.

These summaries give a first approximation of the individual values. The residual of this approximation can be further summarized by another set of jointly chosen per-aspect summaries, and so on.

Furthermore, at nighttime, the relationship between location and temperature/light may be reversed (e.g., window locations are colder and more humid) or the relationship among types may change (e.g., window locations are still bright and humid, but are nonetheless cold). Consequently, approximately the same patterns (scaling factors in the above example) can be used to summarize time intervals (e.g., hours) during daytime. Thus, only one set of patterns would need to be kept for all daytime hours. However, if one tries to use the same patterns during nighttime, the reconstruction of individual values will largely disagree with the actual measurements. Thus, changes in the collection of streams may be detected.

Figure 6:
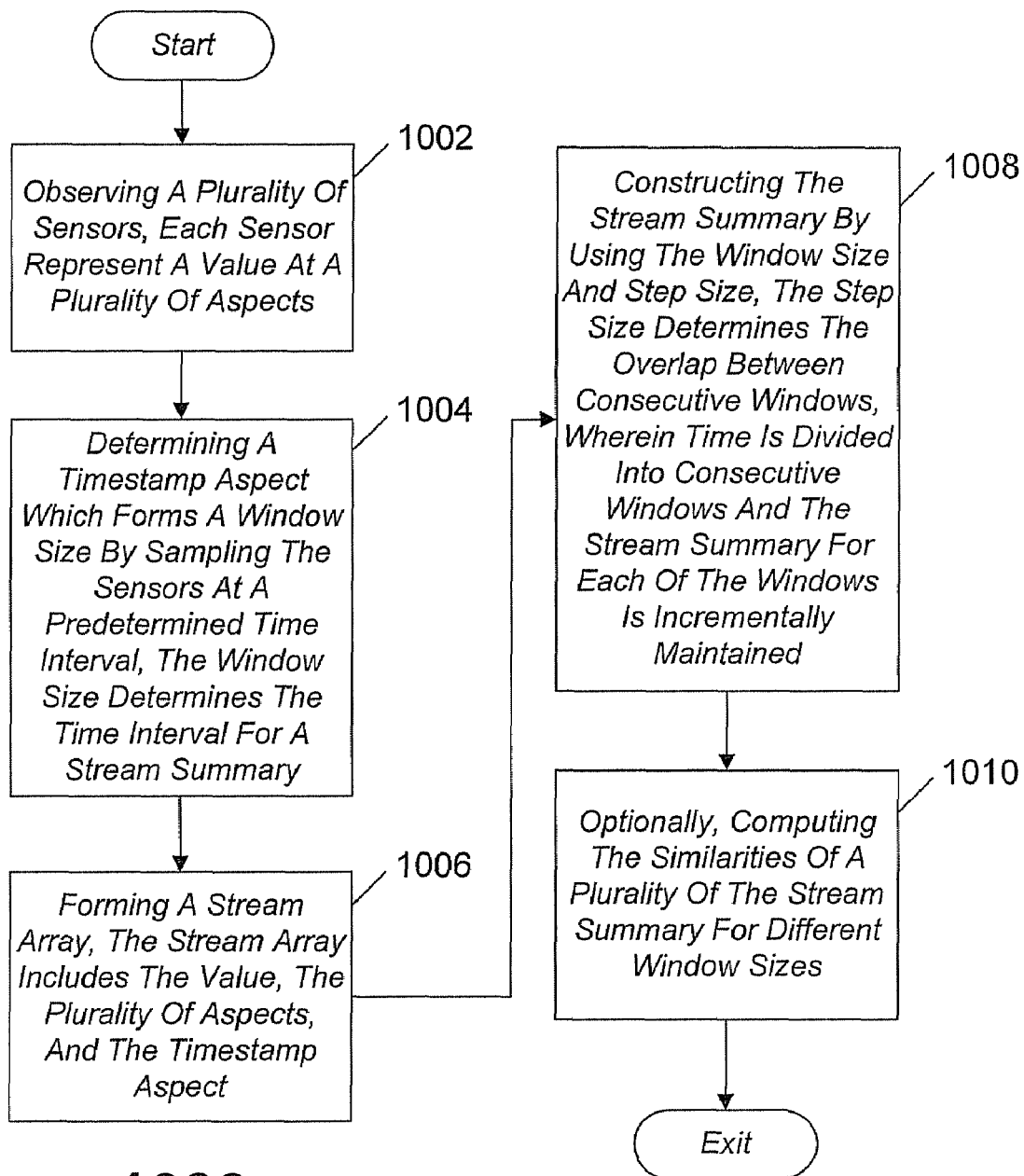
FIG. 6 illustrates one example of a method for summarization of streams of time-ordered information.

Referring to FIG. 6 there is illustrated a method for summarization of streams of time-ordered information. In an exemplary embodiment a plurality of sensors can be observed, data can be collected with a timestamp being associated with each sensor reading, a stream array can be formed, and stream summaries can be constructed. The method begins in block 1002.

In block 1002 a plurality of sensors that represents a value at a plurality of aspects can be observed. Processing then moves to block 1004.

In block 1004 a timestamp aspect is determined for each sensor sample. The timestamp aspect forms a window size. The time interval is predetermined. The window size determines the time interval for a stream summary. Processing moves to block 1006.

In block 1006 a stream array is formed. The stream array includes one value for each of the plurality of aspects and the timestamp aspect. Processing moves to block 1008.

In block 1008 the stream summary is constructed using the window size and a step size. The step size determines the overlap between consecutive windows, wherein time is divided into consecutive windows (possibly overlapping) and the stream summary for each of the windows is incrementally maintained. Processing then moves to block 1010.

In block 1010 optionally the similarities of a plurality of stream summary for different windows sizes can be computed. In addition, optionally other analysis of the stream data can be performed as required and or desired. The routine is then exited.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for summarization of streams of time-ordered information, said method comprising:

observing a plurality of sensors, each of said plurality of sensors represent a value at a plurality of aspects;

determining a timestamp aspect, which forms a window size by sampling said sensors at a predetermined time interval, said window size determines the time interval for a stream summary;

forming a stream array, said stream array includes said value, said plurality of aspects, and said timestamp aspect;

constructing said stream summary by using said window size and a step size, said step size determines the overlap between consecutive said window, wherein time is divided into consecutive windows and said stream summary for each of said window is incrementally maintained; and computing the similarities of a plurality of said stream summary for different said window sizes;

wherein said stream summary for each of said window includes a set of simultaneous 1-D summaries for each aspect, which can be combined to obtain an approximation of the original said stream summary values within each of said window, said set of simultaneous 1-D summaries include one aspect value per said timestamp.

2. The method in accordance with claim 1, wherein the quality of said approximation is measured by the total squared deviation.

3. The method in accordance with claims 1, wherein the similarity of summaries for a new window size resultant from the combination of two of said window sizes is based upon reconstruction quality using the previous said stream summary relative to the reconstruction quality using said stream summary specific to said new window size.

4. The method in accordance with claim 3, wherein said stream summary is chosen so that reconstruction is a multi-linear function of said stream summary.

5. The method in accordance with claim 3, wherein previous said plurality of said stream summary patterns is reused to avoid storing new said plurality of said stream summary patterns, if similarity is sufficiently high.

6. The method in accordance with claim 5, wherein low similarity between said plurality of said stream summary and new said plurality of said stream summary is used to identify change points in the collection of streams.

* * * * *